(12) United States Patent
Park

(10) Patent No.: US 8,730,857 B2
(45) Date of Patent: May 20, 2014

(54) FILTERING GROUP-ADDRESSED FRAMES IN WI-FI DEVICES

(75) Inventor: Minyoung Park, Portland, OR (US)

(73) Assignee: Intel Corporation, Santa Clara, CA (US)

(*) Notice: Subject to any disclaimer, the term of this patent is extended or adjusted under 35 U.S.C. 154(b) by 262 days.

(21) Appl. No.: 13/177,365

(22) Filed: Jul. 6, 2011

(65) Prior Publication Data

US 2013/0010662 A1  Jan. 10, 2013

(51) Int. Cl.
*H04W 4/00* (2009.01)
*H04W 92/00* (2009.01)

(52) U.S. Cl.
USPC ............................ 370/311; 370/338

(58) Field of Classification Search
CPC combination set(s) only.
See application file for complete search history.

(56) References Cited

U.S. PATENT DOCUMENTS

| | | | |
|---|---|---|---|
| 2006/0171341 A1 | 8/2006 | Wang et al. | |
| 2007/0291681 A1* | 12/2007 | Jokela et al. | 370/328 |
| 2008/0151814 A1* | 6/2008 | Jokela | 370/328 |
| 2008/0181161 A1 | 7/2008 | Kim et al. | |
| 2009/0010191 A1 | 1/2009 | Wentink | |
| 2009/0141679 A1 | 6/2009 | Song et al. | |
| 2010/0260091 A1* | 10/2010 | Seok | 370/312 |
| 2011/0007678 A1* | 1/2011 | Kneckt et al. | 370/311 |
| 2011/0286375 A1* | 11/2011 | Chu et al. | 370/311 |
| 2012/0057577 A1* | 3/2012 | Dwivedi et al. | 370/338 |
| 2012/0250597 A1 | 10/2012 | Park | |
| 2013/0058323 A1* | 3/2013 | Bahr | 370/348 |

OTHER PUBLICATIONS

International Search Report and Written Opinion from PCT/US2012/045512 mailed Dec. 27, 2012.
International Preliminary Report on Patentability received for Patent Application No. PCT/US2012/045512, mailed on Jan. 16, 2014, 6 pages.

* cited by examiner

*Primary Examiner* — Chi Pham
*Assistant Examiner* — Soon-Dong D Hyun
(74) *Attorney, Agent, or Firm* — Grossman, Tucker, Perreault & Pfleger, PLLC

(57) ABSTRACT

A method includes the operations of buffering group-addressed frames; generating a first signal field comprising a first rate code selected from a plurality of invalid rate codes; receiving a trigger frame from a wireless station; and transmitting the first signal field in combination with the buffered group-addressed frames in response to the trigger frame.

20 Claims, 6 Drawing Sheets

| RATE (4 bits) | | | | | LENGTH (12 bits) | | | | | | | | | | | MSB | P | SIGNAL TAIL (6 bits) | | | | | |
|---|---|---|---|---|---|---|---|---|---|---|---|---|---|---|---|---|---|---|---|---|---|---|---|
| R1 | R2 | R3 | R4 | R LSB | | | | | | | | | | | | | | "0" | "0" | "0" | "0" | "0" | "0" |
| 0 | 1 | 2 | 3 | 4 | 5 | 6 | 7 | 8 | 9 | 10 | 11 | 12 | 13 | 14 | 15 | 16 | 17 | 18 | 19 | 20 | 21 | 22 | 23 |

FIG. 2

| R1–R4 | Rate (Mb/s) (20 MHz channel spacing) | Rate (Mb/s) (10 MHz channel spacing) | Rate (Mb/s) (5 MHz channel spacing) |
|---|---|---|---|
| 1101 | 6 | 3 | 1.5 |
| 1111 | 9 | 4.5 | 2.25 |
| 0101 | 12 | 6 | 3 |
| 0111 | 18 | 9 | 4.5 |
| 1001 | 24 | 12 | 6 |
| 1011 | 36 | 18 | 9 |
| 0001 | 48 | 24 | 12 |
| 0011 | 54 | 27 | 13.5 |

FILTERING GROUP-ADDRESSED FRAMES IN WI-FI DEVICES

FIELD

The present disclosure relates generally to Wi-Fi devices, and, more particularly, to filtering methods for group-addressed frames in Wi-Fi devices.

BACKGROUND

Within a wireless network, one or more stations (STAs) may communicate with an access point (AP). Some STAs may include high performing STAs such as laptops, etc, which are less constrained by battery life, and smaller battery powered STAs such as for example sensors, which may need to last many years on limited battery capacity. STAs typically enter a power save (PS) mode when not needing to transmit or receive frames. The PS mode is especially important for the STAs with smaller batteries.

Legacy STAs, however, must wake up from PS mode at scheduled time intervals known as Delivery Traffic Indication Message (DTIM) intervals, to listen for beacons from an AP to determine if any group-addressed frames, which have been buffered by the AP, are available to be received. Waking up at DTIM intervals, which can be as short as 200-400 milliseconds (ms), can adversely impact the STA's battery life. More advanced, power saving, STAs have the capability to wake up from PS mode on their own schedule, which may be significantly longer than a DTIM interval, to send a trigger to the AP. The trigger signals to the AP that the STA is ready to receive any available group-addressed frames, which have been buffered by the AP. This power saving may greatly extend battery life of the STA.

A problem arises, however, in that duplicate group-addressed frames may be received by the STAs since these group-addressed frames may be transmitted multiple times, for example, in response to triggers from power saving STAs and at DTIM intervals for legacy STAs. If a legacy STA happens to be awake while a group-addressed frame is being transmitted in response to a trigger from a power saving STA, the legacy STA will receive duplicate frames. Similarly, if a power saving STA happens to be awake during a DTIM interval it will receive duplicate frames.

BRIEF DESCRIPTION OF THE DRAWINGS

Some embodiments of the invention may be better understood by referring to the following description and accompanying drawings that are used to illustrate embodiments of the invention. In the drawings:

FIG. 2 illustrates a bit map of a SIGNAL field consistent with various embodiments of the present disclosure;

FIG. 3 is a table illustrating rates corresponding to valid rate codes consistent with various embodiments of the present disclosure;

Although the following Detailed Description will proceed with reference being made to illustrative embodiments, many alternatives, modifications, and variations thereof will be apparent to those skilled in the art.

DETAILED DESCRIPTION

Generally, the present disclosure provides filtering techniques for group-addressed frames in a wireless network (e.g., Wi-Fi). The Wi-Fi network includes an access point ("AP"), one or more legacy or non-power saving stations that rely on a predetermined interval beacon (e.g., DTIM beacon) to receive group-addressed frames (such a station is referred to herein as a "legacy station"), and at least one station that is modified to generate a trigger frame to receive group-addressed frames (such a station is referred to herein as a "trigger station"). In one embodiment, in response to a trigger frame from a trigger station, the AP is configured to modify a header frame of the group-addressed message. The trigger station that sent the trigger frame is configured to interpret the modified header frame as the start of group-addressed frames, and receive the group-addressed frames. If a legacy station is awake or active during the time the trigger and modified header frames are exchanged, the group-addressed frames that are transmitted by the AP are ignored so that, when the legacy station receives the group-addressed frames during the predetermined interval beacon, the legacy station does not have to compare sequence numbers of received frames to filter out additional copies of the group-addressed frames. In some embodiments, the modified header frame may be unique to each trigger station, while in other embodiments, the modified header frame may be used by a collection of trigger stations within the Wi-Fi network. In addition, in some embodiments, the trigger station is configured to receive group-addressed frames only in response to the trigger frame, and not during the predetermined interval beacon, thus effectively filtering duplicate group-addressed frames that may be sent during the predetermined interval beacon. Thus, significant power and bandwidth savings are realized by providing legacy stations and trigger stations with filtering mechanisms so that computationally expensive compare operations for duplicate group-addressed frames are avoided.

Figure 1:
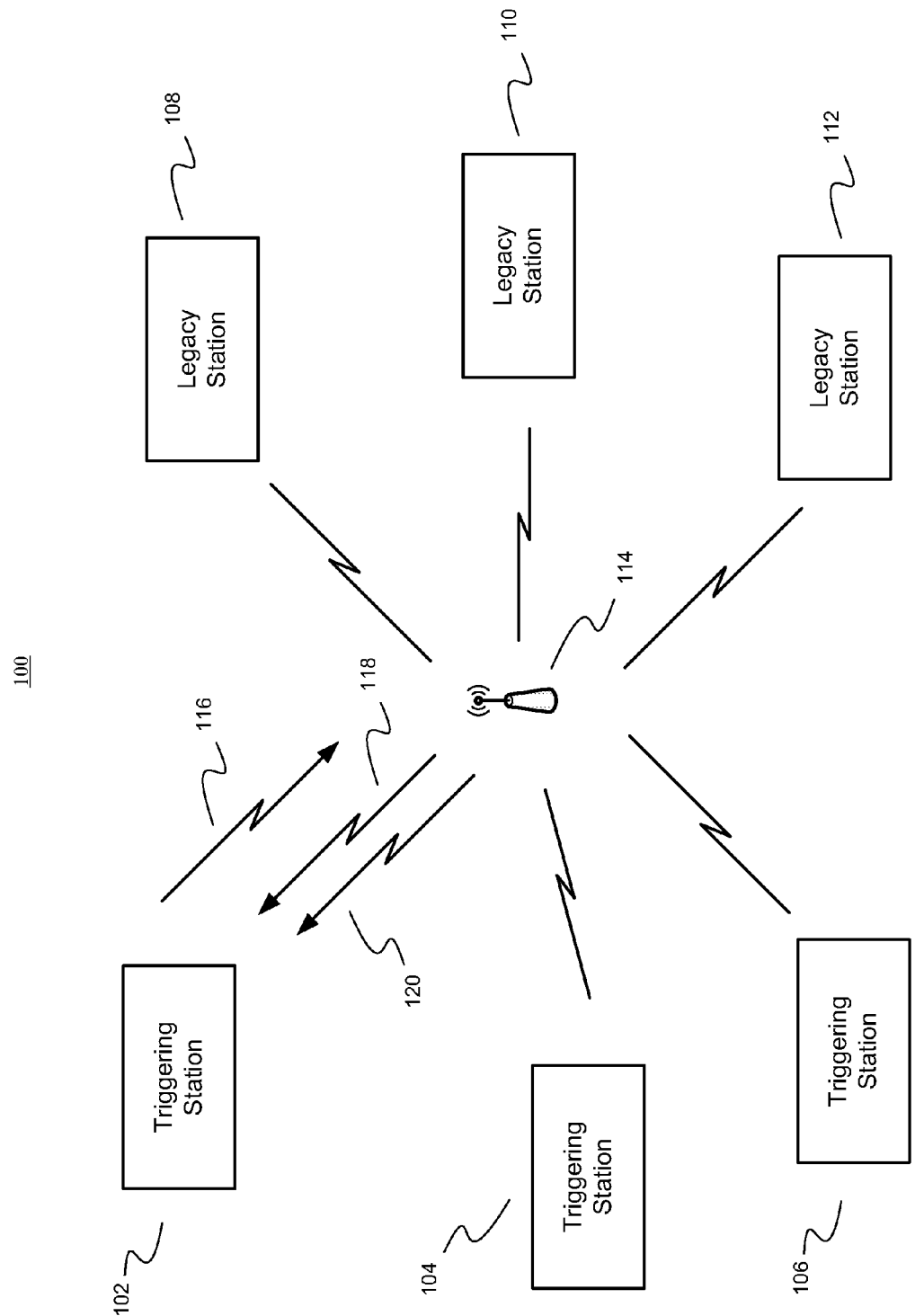
FIG. 1 illustrates a system block diagram of a wireless network consistent with various embodiments of the present disclosure.

FIG. 1 is a system block diagram 100 of a wireless network consistent with various embodiments of the present disclosure. The system 100 includes a plurality of trigger stations 102, 104, 106, a plurality of legacy stations 108, 110, 112 and a wireless network AP 114. The term "wireless" may be used to describe circuits, devices, systems, methods, techniques, communications channels, etc., that communicate data by using modulated electromagnetic radiation through a non-solid medium. The term does not imply that the associated devices do not contain any wires. A wireless device may comprise at least one antenna, at least one radio, at least one memory, and at least one processor, where the radio transmits signals through the antenna that represent data and receives signals through the antenna that represent data, while the processor may process the data to be transmitted and the data that has been received. The processor may also process other data which is neither transmitted nor received.

A station and/or an AP may be embodied as a communication station, a mobile station, an advanced station, a client, a platform, a wireless communication device, a wireless AP, a modem, a wireless modem, a Personal Computer (PC), a desktop computer, a mobile computer, a laptop computer, a notebook computer, a tablet computer, a server computer, a set-top box, a handheld computer, a handheld device, a Personal Digital Assistant (PDA) device, a handheld PDA device, and/or a netbook, wireless sensor, a wireless headphone, a wireless camera, or other wireless-enabled devices.

The stations and/or AP can use signals to communicate in a wireless network such as a Local Area Network (LAN), a Wireless LAN (WLAN), a Metropolitan Area Network (MAN), a Wireless MAN (WMAN), a Wide Area Network (WAN), and a Wireless WAN (WWAN). The stations and/or AP devices may operate in accordance with existing wireless communication protocols such as Next Generation mmWave (NGmS-D02/r0, Nov. 28, 2008), Wireless Gigabit Alliance (WGA), IEEE 802.11, 802.11a, 802.11b, 802.11e, 802.11g, 802.11h, 802.11i, 802.11n, 802.11ac, 802.16, 802.16d, 802.16e, 802.11ah standards and/or the Long Term Evolution (LTE) standard and/or future versions and/or derivatives and/or of the above standards and/or after-developed wireless communication protocols, a Personal Area Network (PAN), a Wireless PAN (WPAN), units and/or devices which are part of the above WLAN and/or PAN and/or WPAN networks, one way and/or two-way radio communication systems, cellular radio-telephone communication systems, a cellular telephone, a wireless telephone, a Personal Communication Systems (PCS) device, a PDA device which incorporates a wireless communication device, a Multiple Input Multiple Output (MIMO) transceiver or device, a Single Input Multiple Output (SIMO) transceiver or device, a Multiple Input Single Output (MISO) transceiver or device, a Maximum Ratio Combining (MRC) transceiver or device, a transceiver or device having "smart antenna" technology or multiple antenna technology, or the like. A station and/or AP operating in accordance with these protocols and/or standards may require the implementation of at least two layers. One layer is the 802.11 MAC layer (i.e., OSI Data/Link Layer 2). Another layer is the 802.11 PHY layer (i.e., OSI Physical Layer 1). The MAC layer may be implemented using either or a combination of dedicated hardware and dedicated software. The PHY layer may be implemented using dedicated hardware or through software emulation.

Some embodiments may be used in conjunction with one or more types of wireless communication signals and/or systems, for example, Radio Frequency (RF), Infra Red (IR), Frequency-Division Multiplexing (FDM), Orthogonal FDM (OFDM), OFDMA, Time-Division Multiplexing (TDM), Time-Division Multiple Access (TDMA), Extended TDMA (E-TDMA), General Packet Radio Service (GPRS), Extended GPRS, Code-Division Multiple Access (CDMA), Wideband CDMA (WCDMA), CDMA 2000, Multi-Carrier Modulation (MDM), Discrete Multi-Tone (DMT), Bluetooth®, ZigBee™, or the like. Embodiments may be used in various other apparatuses, devices, systems and/or networks.

The AP 114, in some embodiments, is configured to buffer multicast/broadcast messages (frames), which include group-addressed frames 120. The group-addressed frames 120 include header information that identifies each of the stations as targets for receiving the frames. The AP 114 is configured to generate a delivery traffic indication message (DTIM) at certain predefined intervals (DTIM interval) to inform the legacy stations 108, 110, 112 of the presence of group-addressed frames for delivery. The legacy stations 108, 110, 112 may each be configured to receive group-addressed frames 120 from the AP 114 only during the DTIM interval.

In various embodiments, the certain trigger stations 102, 104, 106 may have at least two power modes, designated herein as an active mode, in which the trigger station is awake, and a power saving mode during which the trigger station is placed in a non-operational low-power condition. When the trigger station is in the active mode, the trigger station can communicate with the AP 114, for example, to transmit and receive frames. In the power saving mode, the trigger station may not transmit or receive frames.

According to some embodiments, at least one trigger station 102, 104, 106 is configured to send a trigger frame 116 to the AP 114 to initiate transfer of group-addressed frames 120 that may be buffered at the AP 114. In this example, station 102 is so configured. The trigger frame 116 may include, for example, a Quality of Service (QoS) data or QoS Null frame, defined by the IEEE 802.11e protocol. The trigger station 102, 104, 106 may be configured to send the trigger frame 116 outside of a predefined DTIM interval. According to some embodiments, an AP is adapted to be triggered for group-addressed frames to deliver the group-addressed frame to an STA. For example, according to the above schemes, an STA may communicate its ability to trigger the delivery of group-addressed frames by an AP by communicating an Extended Unscheduled Automatic Power Save Delivery (U-APSD) frame to the AP, where the Extended U-APSD element includes an Access Category Group (AC_GR) subfield. Additionally, an AP may communicate its ability to be triggered for group-addressed frames and to deliver group-addressed frames to an STA by communicating an Extended U-APSD element to the STA. The Extended U-APSD element may, for example, be communicated by the AP in a Beacon frame or in a Probe Response frame, and by the STA in an association or re-association frame. It is also possible for an AP to communicate its ability to support the proposed U-APSD scheme of embodiments by responding to an STA's association or re-association frame by including an Extended U-APSD element in its association or re-association response frame to the STA, for example where it may not have communicated such information to the STA previously. When the AC_GR subfield of the Extended U-APSD element is set to 1, and the Extended U-APSD element is sent by the AP, the Extended U-APSD element alerts the STA that the AP is adapted to be triggered to deliver group-addressed frames to the STA. When the AC_GR subfield is set to 1, and the Extended U-APSD element is sent by the STA, the Extended U-APSD element alerts the AP that the STA is adapted to trigger group-addressed frames to be delivered to it by the AP. The STA may, for example, trigger the delivery of group-addressed frames by an AP to itself by sending a QoS Data or a QoS-Null Data frame to that AP.

However, the group-addressed frames 120, once triggered by the trigger station 102, may be broadcast to all stations in the network 100 or multicast to all stations in a multicast group in the network 100. Thus, to prevent stations from receiving duplicate copies of the group-addressed frames (one copy in response to the trigger frame 116, and one copy at the DTIM interval), the AP 114 of this embodiment is configured to modify a header frame so that only the triggering station will receive the group-addressed frames 120 that are sent in response to the trigger frame. In one example, a SIGNAL field 118 (defined by the IEEE 802.11 protocol) of the preamble of the group-addressed frame is modified by the AP 114 so that only the target station (station 102 in this example) will receive the group-addressed frames 120, while the remaining stations that are active during the exchange between the triggering station 102 and the AP 114 will not be able to recognize the SIGNAL field 118, and will discard the group-addressed frames.

FIG. 2 illustrates a bit map 200 of a SIGNAL field consistent with various embodiments of the present disclosure. Bit map 200 comprises a rate code field 202 of length 4 bits (R1-R4) which specifies the data rate code that is associated with the group-addressed frames that will be associated with this SIGNAL field. Bit R4 204 is designated as the most significant bit of the rate code.

FIG. 3 is a table 300 illustrating data rates corresponding to valid rate codes consistent with various embodiments of the present disclosure. Table 300 lists various data rates 304 that correspond to eight valid rate codes 302 out of the sixteen possible rate codes that could be encoded in the four bits (R1-R4) of the rate code field 202. As can be seen from the table 300, the most significant bit of the rate code, R4 204, is set to a 1 for all valid rate codes. Thus, the eight possible invalid rate codes will have bit R4 204 set to a zero. A test of bit R4 204 can therefore be used to efficiently distinguish between a valid rate code and an invalid rate code.

Legacy stations that receive a SIGNAL field with an invalid rate code will ignore the associated group-addressed frames that are transmitted with the SIGNAL field. This provides an efficient mechanism by which an access point can transmit group addressed frames that will be filtered out by the legacy stations. Triggering stations can be configured, however, to recognize that an invalid rate code indicates that the associated group-addressed frames are intended for the triggering stations and therefore may be accepted. Furthermore, triggering stations can be configured to discard group-addressed frames associated with a SIGNAL field that has a valid rate code. This provides an efficient mechanism by which an access point can transmit group addressed frames that will be filtered out by the triggering stations. Thus, if the access point transmits group-addressed frames with a valid rate code at the DTIM intervals, and transmits group-addressed frames with an invalid rate code in response to trigger frames, then both legacy stations and trigger stations may avoid computationally expensive processing of duplicate group-addressed frames.

Although the triggering stations will be receiving invalid rate codes, various coding schemes are possible by which the triggering station can determine, if necessary, the actual rate based on the invalid rate code. In one embodiment, a valid rate code may be generated from an invalid rate code by inverting the most significant bit R4 204. In another embodiment, a valid rate code may be generated from an invalid rate code by inverting all bits (R1-R4) of the rate code field 202.

Figure 4:
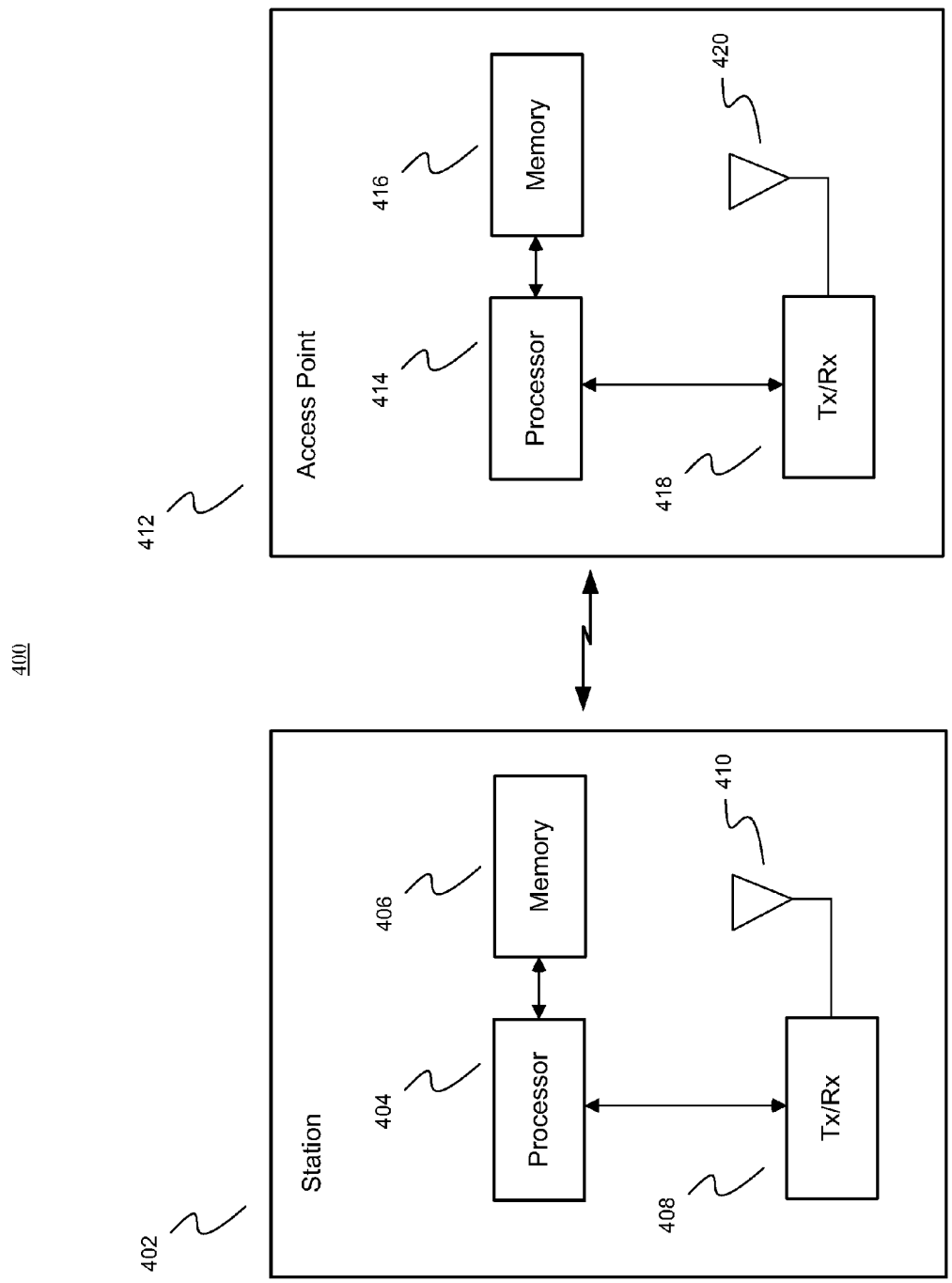
FIG. 4 illustrates a simplified block diagram of a wireless station and access point consistent with various embodiments of the present disclosure.

FIG. 4 illustrates a simplified block diagram 400 of a wireless station and access point consistent with various embodiments of the present disclosure. Wireless station 402 may comprise a processor 404 coupled to a memory 406 and a transmitting/receiving unit 408 which may in turn be coupled to an antenna 410. Wireless access point 412 may comprise a processor 414 coupled to a memory 416 and a transmitting/receiving unit 418 which may in turn be coupled to an antenna 420. Wireless station 402 and wireless access point 412 may both be configured to transmit and receive frames to each other, including group-addressed frames with SIGNAL fields and trigger frames. As previously described, wireless stations and access points may be embodied in many forms. In some embodiments, wireless station 402 and access point 412 may further comprise user interfaces, input/output devices, sensors, storage devices, application software, a power supply and/or other suitable components.

Figure 5:
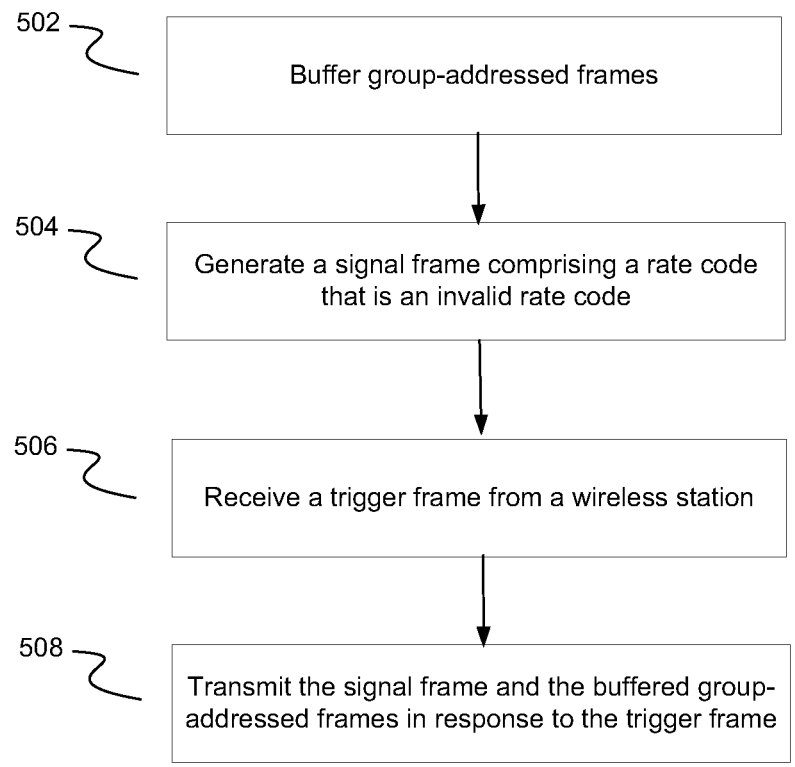
FIG. 5 illustrates a flowchart of operations of one exemplary embodiment consistent with the present disclosure.

FIG. 5 illustrates a flowchart of operations 500 of one exemplary embodiment consistent with the present disclosure. These operations may be performed by an access point. At operation 502, group-addressed frames are buffered. At operation 504, a SIGNAL field is generated. The SIGNAL field specifies an invalid rate code. At operation 506, a trigger frame is received from a wireless station. At operation 508, in response to the trigger frame, the SIGNAL field, with the invalid rate code, and the buffered group-addressed frames are transmitted. In some embodiments the access point may generate a second SIGNAL field specifying a valid rate code and transmit the buffered group-addressed frames with the second signal field at a pre-determined time interval which may be a DTIM interval. Frames may be transmitted as broadcast or multicast frames.

Figure 6:
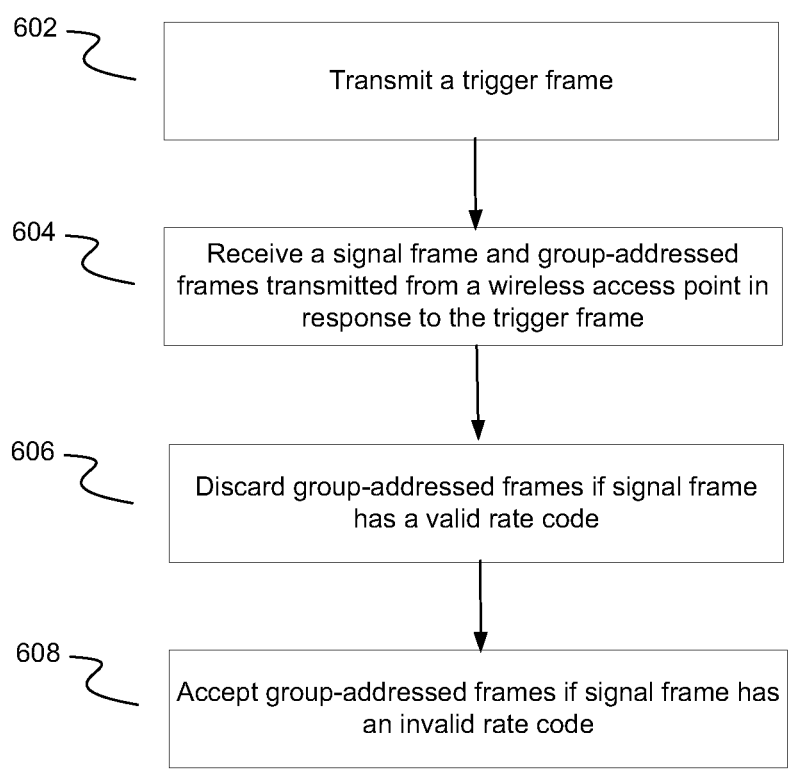
FIG. 6 illustrates a flowchart of operations of another exemplary embodiment consistent with the present disclosure.

FIG. 6 illustrates a flowchart of operations 600 of another exemplary embodiment consistent with the present disclosure. These operations may be performed by a wireless station. At operation 602, a trigger frame is transmitted. The trigger frame may be transmitted in response to the wireless station waking from a power save mode. At operation 604, a SIGNAL field and group-addressed frames are received from a wireless access point in response to the trigger frame. At operation 606, if the SIGNAL field has a valid rate code then the group-addressed frames are discarded. At operation 608, if the SIGNAL field has an invalid rate code then the group-addressed frames are accepted.

In this description, numerous specific details are set forth. However, it is understood that embodiments of the invention may be practiced without these specific details. In other instances, well-known circuits, structures and techniques have not been shown in detail in order not to obscure an understanding of this description.

References to "one embodiment", "an embodiment", "example embodiment", "various embodiments", etc., indicate that the embodiment(s) of the invention so described may include particular features, structures, or characteristics, but not every embodiment necessarily includes the particular features, structures, or characteristics. Further, some embodiments may have some, all, or none of the features described for other embodiments.

In this description and claims, the terms "coupled" and "connected," along with their derivatives, may be used. It should be understood that these terms are not intended as synonyms for each other. Rather, in particular embodiments, "connected" is used to indicate that two or more elements are in direct physical or electrical contact with each other. "Coupled" is used to indicate that two or more elements co-operate or interact with each other, but they may or may not have intervening physical or electrical components between them.

Various embodiments of the invention may be implemented in one or any combination of hardware, firmware, and software. The invention may also be implemented as instructions contained in or on a computer-readable medium, which may be read and executed by one or more processors to enable performance of the operations described herein. A computer-readable medium may include any mechanism for storing information in a form readable by one or more computers. For example, a computer-readable medium may include a tangible storage medium, such as but not limited to read only memory (ROM); random access memory (RAM); magnetic disk storage media; optical storage media; a flash memory device, etc.

It should be noted that "circuitry" or "circuit", as used in any embodiment herein, may comprise, for example, singly or in any combination, hardwired circuitry, programmable circuitry, state machine circuitry, and/or circuitry available in a larger system, for example, discrete elements that may be included as part of an integrated circuit.

The terms and expressions which have been employed herein are used as terms of description and not of limitation, and there is no intention, in the use of such terms and expressions, of excluding any equivalents of the features shown and described (or portions thereof), and it is recognized that various modifications are possible within the scope of the claims.

Accordingly, the claims are intended to cover all such equivalents. Various features, aspects, and embodiments have been described herein. The features, aspects, and embodiments are susceptible to combination with one another as well as to variation and modification, as will be understood by those having skill in the art. The present disclosure should, therefore, be considered to encompass such combinations, variations, and modifications.

What is claimed is:

1. A wireless access point, comprising:
   circuitry configured to:
      buffer group-addressed frames in a memory; and
      generate a first signal field comprising a first rate code selected from a plurality of invalid rate codes; and
   a transmitting/receiving unit configured to:
      receive a trigger frame from a wireless station; and
      transmit said first signal field in combination with said buffered group-addressed frames in response to said trigger frame.

2. The wireless access point of claim 1 further configured to:
   generate a second signal field comprising a second rate code selected from a plurality of valid rate codes; and
   transmit said second signal field in combination with said buffered group-addressed frames at a pre-determined interval.

3. The wireless access point of claim 2, wherein each of said invalid rate codes is generated by inverting all bits of a corresponding one of said valid rate codes.

4. The wireless access point of claim 2, wherein each of said invalid rate codes is generated by inverting a most significant bit of a corresponding one of said valid rate codes.

5. The wireless access point of claim 1, wherein said transmitting in response to said trigger frame is performed at a rate associated with a valid rate code corresponding to said invalid rate code.

6. The wireless access point of claim 1, wherein said group-addressed frames are one of broadcast frames or multicast frames.

7. A wireless station, comprising:
   a transmitting/receiving unit configured to:
      transmit a trigger frame;
      receive a signal field in combination with group-addressed frames, said signal field and group-addressed frames transmitted from a wireless access point in response to said trigger frame; and
   circuitry configured to:
      discard said group-addressed frames if said signal field comprises a valid rate code; and
      accept said group-addressed frames if said signal field comprises an invalid rate code.

8. The wireless station of claim 7 further configured to determine a rate by inverting all bits of said invalid rate code.

9. The wireless station of claim 7 further configured to determine a rate by inverting a most significant bit of said invalid rate code.

10. The wireless station of claim 7 further configured to transmit said trigger frame in response to waking from a power save mode.

11. A method, comprising:
   buffering group-addressed frames;
   generating a first signal field comprising a first rate code selected from a plurality of invalid rate codes;
   receiving a trigger frame from a wireless station; and
   transmitting said first signal field in combination with said buffered group-addressed frames in response to said trigger frame.

12. The method of claim 11, further comprising:
   generating a second signal field comprising a second rate code selected from a plurality of valid rate codes; and
   transmitting said second signal field in combination with said buffered group-addressed frames at a pre-determined interval.

13. The method of claim 12, wherein each of said invalid rate codes is generated by inverting all bits of a corresponding one of said valid rate codes.

14. The method of claim 12, wherein each of said invalid rate codes is generated by inverting a most significant bit of a corresponding one of said valid rate codes.

15. The method of claim 11, wherein said transmitting in response to said trigger frame is performed at a rate associated with a valid rate code corresponding to said invalid rate code.

16. The method of claim 11, further comprising transmitting said group-addressed frames as one of broadcast frames or multicast frames.

17. A method, comprising:
   transmitting a trigger frame;
   receiving a signal field in combination with group-addressed frames, said signal field and group-addressed frames transmitted from a wireless access point in response to said trigger frame;
   discarding said group-addressed frames if said signal field comprises a valid rate code; and
   accepting said group-addressed frames if said signal field comprises an invalid rate code.

18. The method of claim 17 further comprising determining a rate by inverting all bits of said invalid rate code.

19. The method of claim 17 further comprising determining a rate by inverting a most significant bit of said invalid rate code.

20. The method of claim 17 further comprising transmitting said trigger frame in response to waking from a power save mode.

* * * * *